United States Patent
DeLuca et al.

(10) Patent No.: US 10,742,588 B2
(45) Date of Patent: Aug. 11, 2020

(54) REPRESENTATIVE MEDIA ITEM SELECTION FOR ELECTRONIC POSTS

(71) Applicant: International Business Machines Corporation, Armonk, NY (US)

(72) Inventors: Lisa Seacat DeLuca, Baltimore, MD (US); Jeremy A. Greenberger, San Jose, CA (US); Kelley Anders, East New Market, MD (US); Jeremy R. Fox, Georgetown, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/141,082

(22) Filed: Sep. 25, 2018

(65) Prior Publication Data
US 2020/0099647 A1    Mar. 26, 2020

(51) Int. Cl.
*H04L 12/58* (2006.01)
*G06N 20/00* (2019.01)
*G06F 16/48* (2019.01)

(52) U.S. Cl.
CPC .............. *H04L 51/32* (2013.01); *G06F 16/48* (2019.01); *G06N 20/00* (2019.01); *H04L 51/02* (2013.01); *H04L 51/10* (2013.01); *H04L 51/16* (2013.01)

(58) Field of Classification Search
CPC ......... H04L 51/02; H04L 51/10; H04L 51/16; H04L 51/32; G06N 20/00; G06F 16/48
USPC ........................................................ 709/206
See application file for complete search history.

(56) References Cited

U.S. PATENT DOCUMENTS

| | | | |
|---|---|---|---|
| 8,522,131 B1* | 8/2013 | Geddes | G06F 16/9574 715/234 |
| 8,527,345 B2 | 9/2013 | Rothschild | |
| 8,849,931 B2 | 9/2014 | Linner | |
| 8,947,547 B1 | 2/2015 | Millikan | |
| 9,049,259 B2 | 6/2015 | Rathod | |
| 2004/0119741 A1* | 6/2004 | Teng | G09G 5/00 715/760 |
| 2005/0283609 A1* | 12/2005 | Langford | G06F 21/64 713/176 |
| 2008/0056574 A1* | 3/2008 | Heck | G06F 17/2765 382/177 |
| 2014/0012923 A1* | 1/2014 | Caldwell | G06Q 10/107 709/206 |
| 2014/0181219 A1* | 6/2014 | Wang | H04L 51/32 709/206 |

(Continued)

OTHER PUBLICATIONS

"What You Need to Know About Open Graph Meta Tags for Total Facebook and Twitter Mastery"; retrieved Mar. 1, 2018; 16 pages; https://blog.kissmetrics.com/open-graph-meta-tags/.

(Continued)

*Primary Examiner* — James E Springer
(74) *Attorney, Agent, or Firm* — Fabian VanCott; Steven L. Nichols (57) ABSTRACT

Representative media item selection for electronic posts is described. According to a computer implemented method, an electronic post generated by an author is textually analyzed. A representative media item is selected for the electronic post based on the textual analysis. The representative media item is inserted into the electronic post before publishing the electronic post.

19 Claims, 6 Drawing Sheets

(56) References Cited

U.S. PATENT DOCUMENTS

| | | | |
|---|---|---|---|
| 2014/0223318 A1* | 8/2014 | Pefferle | H04N 1/00156 |
| | | | 715/738 |
| 2014/0337697 A1* | 11/2014 | Ryu | H04W 4/21 |
| | | | 715/205 |
| 2015/0293982 A1 | 10/2015 | DeLuca | |
| 2016/0042253 A1* | 2/2016 | Sawhney | G06F 16/50 |
| | | | 382/190 |
| 2017/0032043 A1* | 2/2017 | Pestov | G06F 16/954 |
| 2018/0225306 A1* | 8/2018 | He | G10L 15/26 |
| 2019/0138656 A1* | 5/2019 | Yang | G06N 20/00 |

OTHER PUBLICATIONS

"How to Automatically Post Images to Twitter when You Share Blog Posts"; 10 pages; retrieved Mar. 1, 2018; http://aprettierweb.com/post-images-to-twitter-when-share-blog-posts/.

Rampton, John; "7 Free Ways for Boosting Your Social Media Engagement"; 4 pages; https://www.forbes.com/sites/johnrampton/2014/09/22/7-free-ways-for-boosting-your-social-media-engagement/#70661c39713f.

Kolowich, Lindsay; "How to Optimize Blog Images for Social Sharing: An Intro to Open Graph Tags"; 12 pages; retrieved Mar. 1, 2018; https://blog.hubspot.com/marketing/open-graph-tags-facebook-twitter-linkedin.

"Social Networks Auto-Poster—Images: How the SNAP WordPress Plugin sets Images"; 9 Pages; retrieved Mar. 1, 2018; https://www.nextscripts.com/snap-features/how-snap-sets-images/.

* cited by examiner

REPRESENTATIVE MEDIA ITEM SELECTION FOR ELECTRONIC POSTS

BACKGROUND

The present invention relates to the selection of media items for an electronic post, and more specifically to selecting, and inserting into the electronic post, a representative media item based on a textual analysis of the electronic post. Through a wide variety of forums, a user can draft messages to be posted. Once posted, those messages are seen by a variety of other users, such as friends or other acquaintances of the posting user.

SUMMARY

According to an embodiment of the present invention, a computer-implemented method is described. According to the method, an electronic post generated by an author is textually analyzed. A representative media item for the electronic post is selected based on this textual analysis. The representative media item is inserted into the electronic post before the electronic post is published.

A system is also described. A media determiner of the system determines that an electronic post generated by an author is not associated with an associated media item. A textual analyzer of the system analyzes the electronic post and a media selector selects a representative media item for the electronic post based on the textual analysis. A message editor of the system inserts the representative media item into the electronic post before publishing the electronic post.

The present specification also describes a computer program product. The computer program product includes a computer readable storage medium having program instructions embodied therewith. The program instructions are executable by a processor to cause the processor to receive an identification of a media repository from which a representative media item is extracted. The program instructions are also executable by the processor to determine that a social media electronic post generated by an author is not associated with an associated media item and textually analyze the social media electronic post. The program instructions are also executable by the processor to extract, based on the textual analysis, a media item from the media repository as the representative media item for the electronic post and insert the representative media item into the social media electronic post before publishing the social media electronic post.

DETAILED DESCRIPTION

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Social media and other online forums have provided a new and exciting mode of communication for the public in general. In such forums, a user may generate a post. The author may then publish the post, which is to make the post available for others to sec. The post may be a message to a particular individual, a post for a particular number of connections of the user, or a public post to a more general audience on the forum platform. However, while such social media platforms and other online forums have greatly increased the interconnectedness of society and have provided a vehicle for efficient and useful information delivery, improved operation of these platforms may increase their overall effectiveness.

For example, as social posting is accessible to such a large portion of the population, it is easy for a particular post to get lost in the crowd. For example, a user may publish a post to a particular group of individuals. These posts may get lost in the mass of posts that the group of individuals may receive. When a user posts a message within the platform or forum, the likelihood of users engaging with that post increase significantly when an image or other media is associated with the post. That is, the effectiveness of electronic communication is enhanced by the use of images in electronic posts.

Accordingly, the present specification describes a system and method wherein a media item that is representative of an electronic post, which electronic post does not already have an embedded or linked media item associated with it, is selected and inserted into the electronic post, thus increasing its communication efficacy. Specifically, according to the present specification, a generated electronic post is textually analyzed using any number of textual analytic tools. Based on the analysis, a representative media item is selected and then inserted into the electronic post before it is published on the platform or forum.

As used in the present specification and in the appended claims, the term "media item" refers to various types of media including pictures, videos, audio, animations, and other forms of media. Still further, as used in the present specification and in the appended claims, the term "associated media item" refers to a media item associated with the post before a representative media item is selected.

Further, as used in the present specification and in the appended claims, the term "post" refers to content, such as text that is uploaded through a network where it is shared with others.

As used in the present specification and in the appended claims, the term "a number of" or similar language is meant to be understood broadly as any positive number including 1 to infinity.

Figure 1:
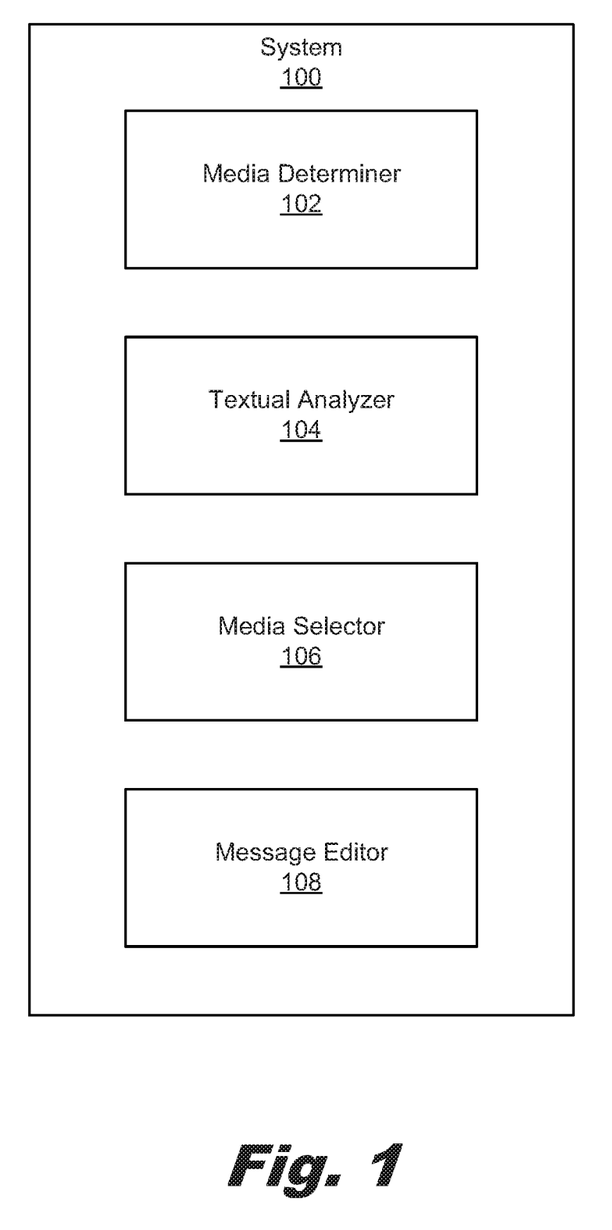
FIG. 1 depicts a system for selecting a representative media item for an electronic post, according to an example of principles described herein.

Turning now to the figures, FIG. 1 depicts a system (100) for selecting a representative media item for an electronic post, according to an example of principles described herein. To achieve its desired functionality, the system (100) includes various components. Each component may include a combination of hardware and program instructions to perform a designated function. The components may be hardware. For example, the components may be implemented in the form of electronic circuitry (e.g., hardware). Each of the components may include a processor to execute the designated function of the component. Each of the components may include its own processor, but one processor may be used by all the components. For example, each of the components may include a processor and memory.

Alternatively, one processor may execute the designated function of each of the components.

The system (100) includes a media determiner (102). The media determiner (102) determines that an electronic post does not have an associated media item. An associated media item is a media item that is associated with the electronic post before a representative media item is inserted. In some examples, the associated media item may be associated with the electronic post in a variety of ways. For example, the electronic post may include an embedded media item. Meaning that the media item itself is part of the body of the electronic post. Such a media determiner (102) in this example, would search for a tag or metadata that identifies the embedded media item in the electronic post. When such information is not found, the media determiner (102) determines that the electronic post does not include an embedded media item.

In another example, the electronic post may include a linked media item. That is, the electronic post may include a uniform resource locator (URL). The URL may direct a computing system to a website that includes a media item. In this example, the media determiner (102) searches for such a URL. When such a URL or other pointer to a media item is not found, the media determiner (102) determines that the electronic post does not include a linked media item.

The system (100) also includes a textual analyzer (104) to analyze the electronic post. That is, once the media determiner (102) indicates that the electronic post does not include, nor reference, an associated media item, the textual analyzer (104) begins the process of selecting and inserting a representative media item by analyzing the electronic post. That is, the electronic post includes words that convey a meaning. The textual analyzer considers the words of the post to determine the substance of what is being communicated in that electronic post. The textual analyzer (104) analyzes the electronic post in any number of ways. For example, the textual analyzer (104) may identify keywords within the electronic post that indicate the content of the electronic post. In another example, the context of the electronic post may be analyzed. The context of an electronic post may include the relationship between the parties. For example, a sender and recipient may be business associates. In another example, the sender and recipient may be friends. Such a context serves as a window in to the content of the electronic post and the selected representative media item.

In another example, the textual analyzer (104) may identify an organization that is either mentioned in the electronic post or that sent or received the electronic post. Such information may be relevant in the selection of a representative media item. For example, an advertisement from a business may not include an embedded media item or a linked media item, and the textual analyzer (104) may recognize the business as the sender. Accordingly, the representative media item may be one that highlights the business. Similarly, the textual analyzer (104) may perform brand identification to identify a brand mentioned in, or otherwise associated with the electronic post. Similarly, the selected media item may highlight the particular brand.

In yet another example, the textual analyzer (104) may perform sentiment analysis and/or tone analysis on the electronic post. As with the other analysis tools, sentiment and tone analysis can affect what representative media item is selected. For example, a representative media item related to an electronic post that states, "I love my new car," may be a graphic of a shiny car. By comparison, a representative media item related to an electronic post that states, "my car broke down again," may be a graphic that represents an old, non-functioning car.

As yet another example, the textual analyzer (104) may perform location identification and temporal identification. Based on this information, a particular representative media item may be selected that relates to the location where the electronic post was generated and/or the time when the electronic post was generated. While specific reference is made to particular types of textual analysis, the textual analyzer (104) may rely on other methods of textual analysis to provide criteria by which a representative media item may be selected for an electronic post that does not include, nor reference, an initial associated media item.

Based on an output of the textual analyzer (104), the media selector (106) selects a representative media item for the electronic post. For example, the media selector (106) may access a database, or repository of media. The results of the textual analyzer (104) are passed to the media selector (106), which uses the results as input to select a particular media item to include in the electronic post. The media repository from which a representative media item is selected may be of a variety of forms. For example, the media repository may be a unique set of media for the user. For example, the user may have previously posted media to a social media website. Accordingly, in this example, the media selector (106) may select from the users past posts, a particular representative media item. Similarly, the media repository may be an album of a contact of the author of the electronic post.

In another example, the repository may be a media repository service. That is, a third-party may manage a repository that includes media of a wide variety and the representative media item may be selected from this repository. In another example, the media repository may be a website. In either of these examples, the selection of the repository service or the website may be received from a user, such as an author of the electronic post or the provider through which the electronic post is sent. That is, an author may indicate a particular repository service they prefer, and that repository service may be searched for an appropriate representative media item. In another example, the provider through which the electronic post is sent may have a default repository from which the media item is selected from. For example, a social media provider may select a repository service and all electronic posts through that social media platform have representative media items selected from the provider-indicated repository service.

In yet another example, the media selector (106) could perform an internet search based on the analysis. For example, if the analysis determines that the electronic post relates to trees, the media selector (106) may execute an image search for "tree" and select a representative media item from the results. While particular reference is made to particular media repositories, other media repositories may be used. Moreover, in some examples, multiple media repositories such as those described above, may be relied on in the selection of a representative media item.

The system (100) also includes a message editor (108) to insert the representative media item into the electronic post. Such insertion is done before publishing the electronic post such that when the electronic post is published, the representative media item is disposed therein. That is, the media selector (106) passes the selected representative media item to the message editor (108), and the message editor (108) includes the representative media item into the electronic post. In some examples, this may include embedding the representative media item into the body of the electronic post. In other examples, the insertion includes providing the link, or other pointer, to the representative media item in the electronic post.

In some examples, the message editor (108) inserts the representative media item automatically without additional input from a user. That is, an author generates the electronic post and then triggers selection of a representative media item by clicking an icon such as "send" or "post". Then, the media selector (106) selects a representative media item which is inserted to the electronic post editor (108), and subsequently sent. That is, the action of clicking "send"/"post" triggers 1) insertion of the representative media item and 2) posting of the electronic post with the representative media item. In some examples, the action of clicking "send"/"post" also triggers any one of 1) determining that the electronic post does not include an associated media item, 2) textual analysis of the electronic post, and 3) selection of a representative media item.

In another example, the message editor (108) inserts the representative media item following authorization from a user. In this example, following composition of the electronic post, representative media item selection is triggered by some action such as clicking on a "send"/"post" icon or clicking on an icon that explicitly relates to the selection of a representative media item. Once a media item is selected following such action, the selected representative media item is presented to the user and the user may select whether to insert the representative media item or not. Such authorization provides a user with more control over the composition and configuration of the electronic post.

Accordingly, in this example, a user can generate an electronic post and the system (100) aides the user in increasing the efficacy of their electronic post by inserting a related media item into the electronic post.

Figure 2:
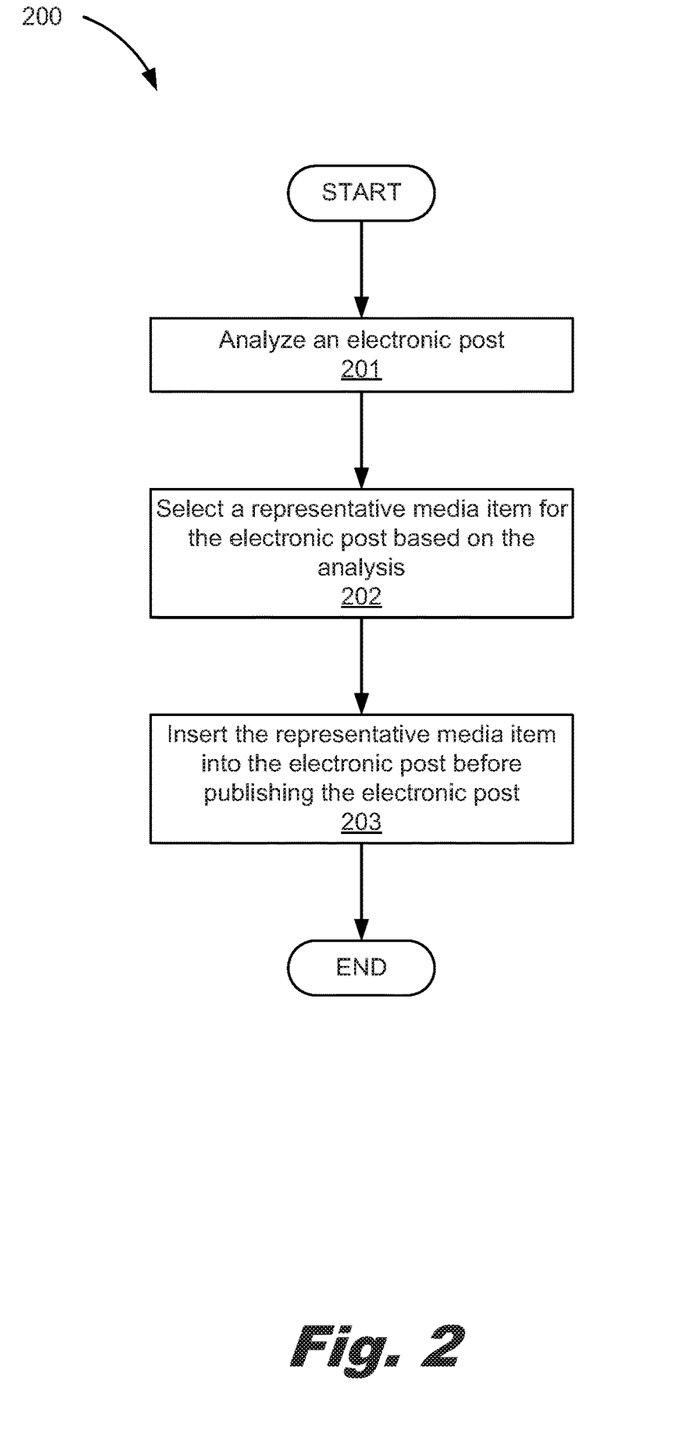
FIG. 2 depicts a flowchart of a method for selecting a representative media item for an electronic post, according to an example of principles described herein.

FIG. 2 depicts a flowchart of a method (200) for selecting a representative media item for an electronic post, according to an example of principles described herein. In some examples, the method (200) includes receiving a trigger to initialize the selection of a representative media item. For example, a user, following generation of the electronic post, may click on an icon to perform media selection and insertion. In another example, the trigger is based on a setting in a user's profile. That is, the profile may include an authorization by the user to perform media selection and insertion. In this example the user, by clicking on an icon such as a "send" icon, may trigger the media selection. In another example, media selection and insertion is a default setting by the platform or forum where the electronic post is to be posted. In this example, a user may have the ability to override the default, for example, by opting out of the media selection and insertion.

Once triggered, the method (200) includes analyzing (block 201) the electronic post. That is, as described, the textual analyzer (FIG. 1, 104) can employ any number of analysis operations to determine a context and/or topic for the electronic post. As a specific example, a user may enter a social media electronic post via a social media platform. In this example, the media determiner (FIG. 1, 102) determines that there is no initial media, i.e. graphic, video, audio etc., embedded and there are no links in the electronic post. Following composition, a user now wishes to share the message and clicks on an icon such as a "send" icon or a "post" icon or in the case of manual triggering an icon such as an "insert media item" icon. Following such an action, the electronic post is analyzed (block 201) using any of the above mentioned tools to determine a context/topic of the electronic post.

In some examples, analyzing (block 201) the electronic post includes determining a topic for the electronic post. For example, an electronic post may state "I love hamburgers." Accordingly, a determined topic, based on a variety of analysis techniques, may be hamburgers. Accordingly, a representative media may correspond to the topic, in this case hamburgers.

Still further, analyzing (block 201) the electronic post in some examples includes identifying individuals associated with the electronic post. An individual may be associated with an electronic post in a variety of ways. For example, a sender and a recipient of an electronic post may be associated with a corresponding electronic post. As another example, an individual mentioned in an electronic post may be associated with the electronic post. For example, an electronic post may state "I had a great time at Jane's birthday party yesterday." As additional examples, such an identification of individuals may be via tags within the electronic post, identifiers within the electronic post, and fields associated with the electronic post.

With the electronic post analyzed (block 201), a media selector (FIG. 1, 106) selects (block 202) a media item that is representative of the electronic post. That is, as described above, the media selector (FIG. 1, 106) selects from a media repository, a representative media item that relates to the content and/or topic of the electronic post.

In the example where individuals associated with the electronic post are identified, the representative media item may be selected (block 202) based on the identified individuals. For example, the representative media item selected may be a picture that includes any number of the individuals and may be selected from a media repository, such as an album associated with any one of those individuals.

As another example the representative media item may be selected (block 202) based on characteristics of the identified individuals. For example, the individuals associated with the electronic post may have certain preferences relating to media usage and a representative media item may be selected accordingly. Such user preferences may be indicated in a profile or based on historical information. For example, a profile of a sender may indicate their preference to use media items from their albums. As another example, historical data may indicate that a user historically selects media items that are digitized as opposed to photographs. Accordingly, a representative media item could be selected based on such information.

In yet another example, the selection of the representative media item and the extraction thereof may be based on the platform on which the representative media item is to be published. For example, certain platforms may have certain formatting criteria to be met. Accordingly, the system (FIG. 1, 100) may consider this platform and associated formatting criteria in determining which representative media item to select.

With a representative media item selected (block 202), the representative media item can be inserted (block 203) into the electronic post before publishing the post. As described above, the insertion (block 203) of the representative media item may be based on express authorization from a user to insert the representative media item, or based on an implied authorization when a user authorizes a publishing of the post in its original form (in which the representative media item has not yet been inserted).

Figure 3:
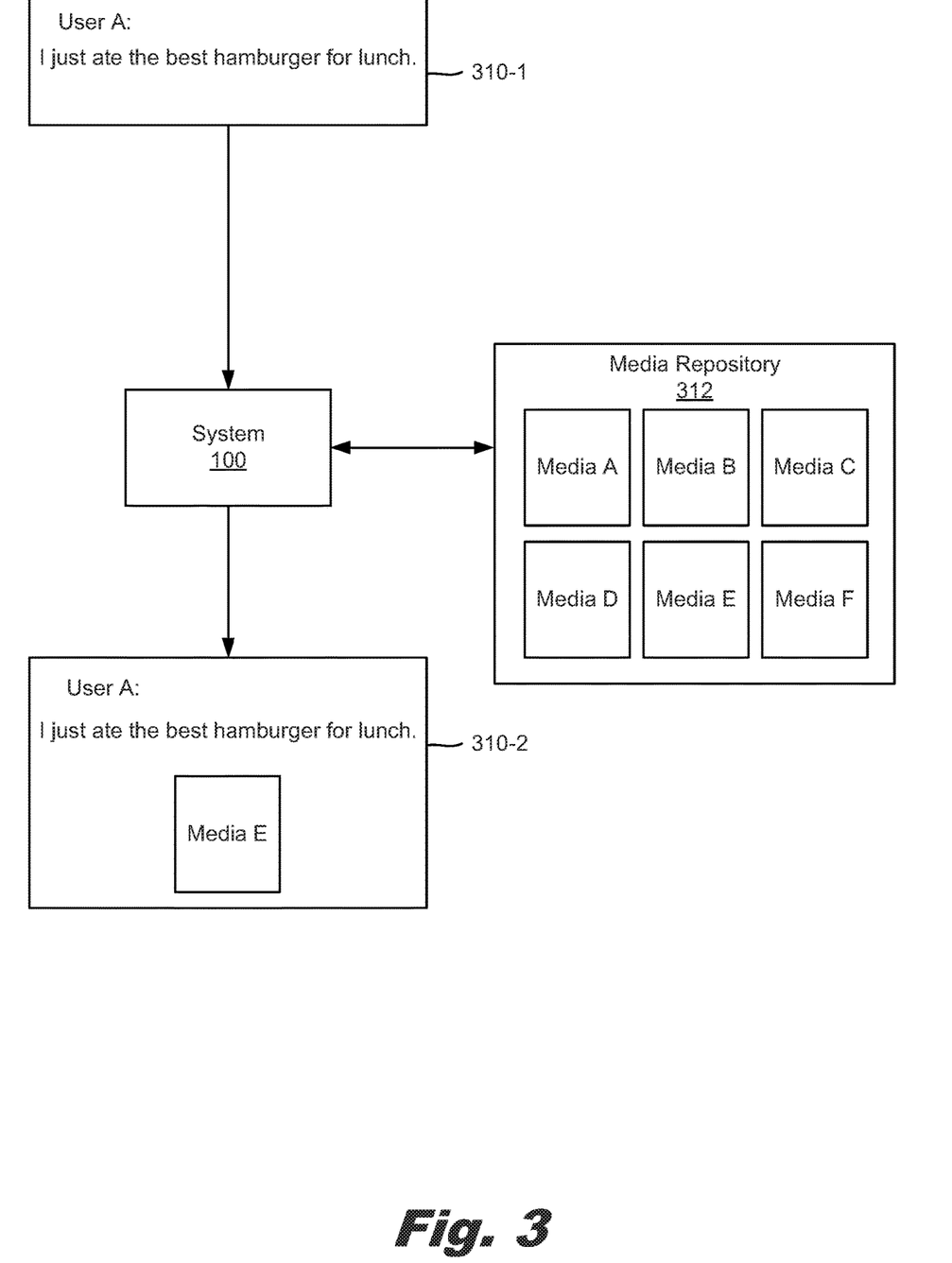
FIG. 3 depicts the selection of a representative media item for an electronic post, according to an example of principles described herein.

FIG. 3 depicts the selection of a representative media item for an electronic post (310), according to an example of principles described herein. In this example, User A generates an electronic post (310-1) with the text "I just ate the best hamburger for lunch." Then, based on a user action such as clicking a "send/post" icon or another icon to trigger representative media selection, the post (310-1) is passed to the system (100). A media determiner (FIG. 1, 102) of the system (100) notices that there is no associated media for the electronic post (310-1). The textual analyzer (FIG. 1, 104) analyzes the electronic post (310-1) post to determine that the topic of the electronic post (310-1) is hamburgers. The textual analyzer (FIG. 1, 104) passes the determined topic to the media selector (FIG. 1, 106) which retrieves an image of a hamburger as the representative media item. Specifically, the media selector (FIG. 1, 106) may access a media repository (312) that includes a number of media items. From those number of media items and based on the analysis by the textual analyzer (FIG. 1, 104), the media selector (FIG. 1, 106) selects "Media E" as the representative media item.

The selected "Media E" is then inserted into the revised electronic post (310-2), either automatically or following User A's authorization, and the revised post (310-2) is published to the platform or other intended forum.

Accordingly, the system (100) facilitates the inclusion of representative media items that are related to the electronic post (310), which electronic post (310) is not otherwise associated with an associated media item. Thus, the system (100) enhances the efficacy of the electronic post (310) by providing the inclusion of a representative media item, which may increase the readership and attention given to an electronic post (310) by its audience.

Figure 4:
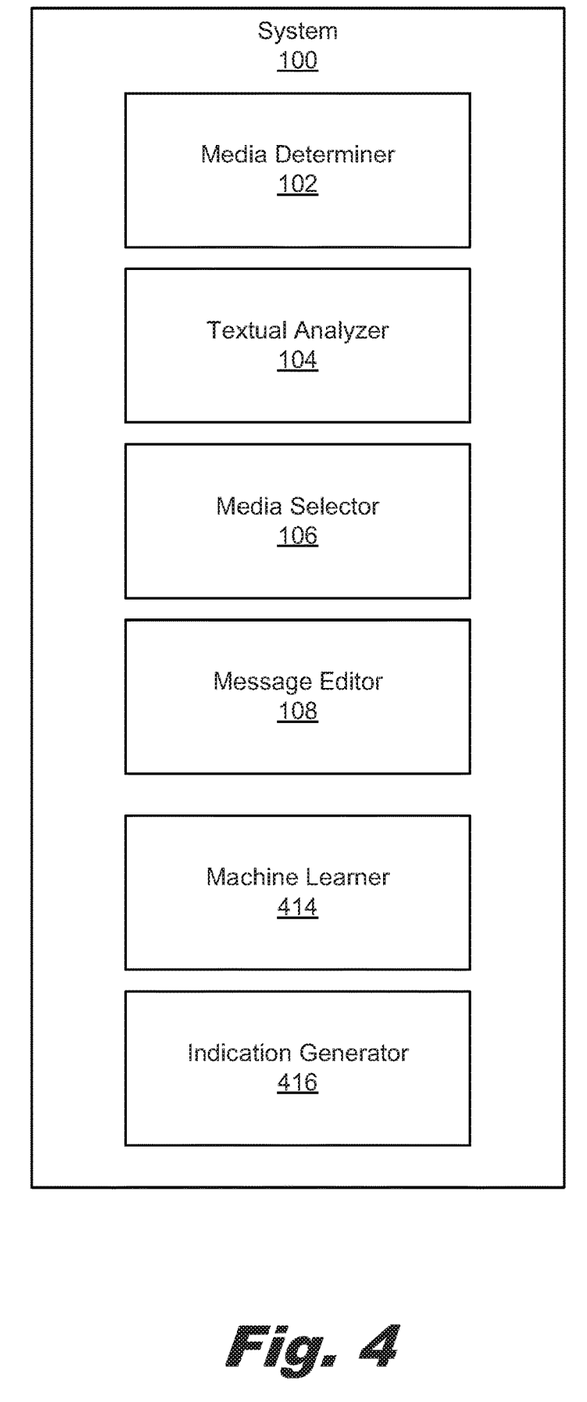
FIG. 4 depicts a system for selecting a representative media item for an electronic post, according to another example of principles described herein.

FIG. 4 depicts a system (100) for selecting a representative media item for an electronic post (FIG. 3, 310), according to another example of principles described herein. As described above, the system (100) includes a media determiner (102), a textual analyzer (104), a media selector (106), and a message editor (108).

In some examples, the system (100) includes additional components. For example, the system (100) may include a machine learner (414) to learn user trends over time. For example, as will be described below, a user may be presented with a variety of candidate media for selection as a representative media item. The machine learner (414) may employ iterative machine learning to determine, for a given set of situations, the trends of a user in selecting a representative media item. This information could be passed to the media selector (106) to select representative media items that are more in line with the user's preferences and trends as indicated by the machine learner (414). In other words, the machine learner (414) allows the system (100) to predict the selection of media and can select candidate media that best suit the user based on the situation-based posting.

As described above, in some examples, a multitude of candidate media items could be presented to a user for selection as the representative media item. Accordingly, in this example, the system (100) includes an indication generator (416) to allow selection of a candidate representative media item. The indication generator (416) could also provide an indication to the user as to the rationale for including a media item in the post (310) and why a particular media item was selected as representative. For example, the indication could state the above-mentioned benefit of increasing the likelihood of reader interaction with the electronic post (FIG. 3, 310) and could present the criteria by which the candidate media item was selected, for example based on the results of the textual analysis and based on the machine-learned trends.

Figure 5:
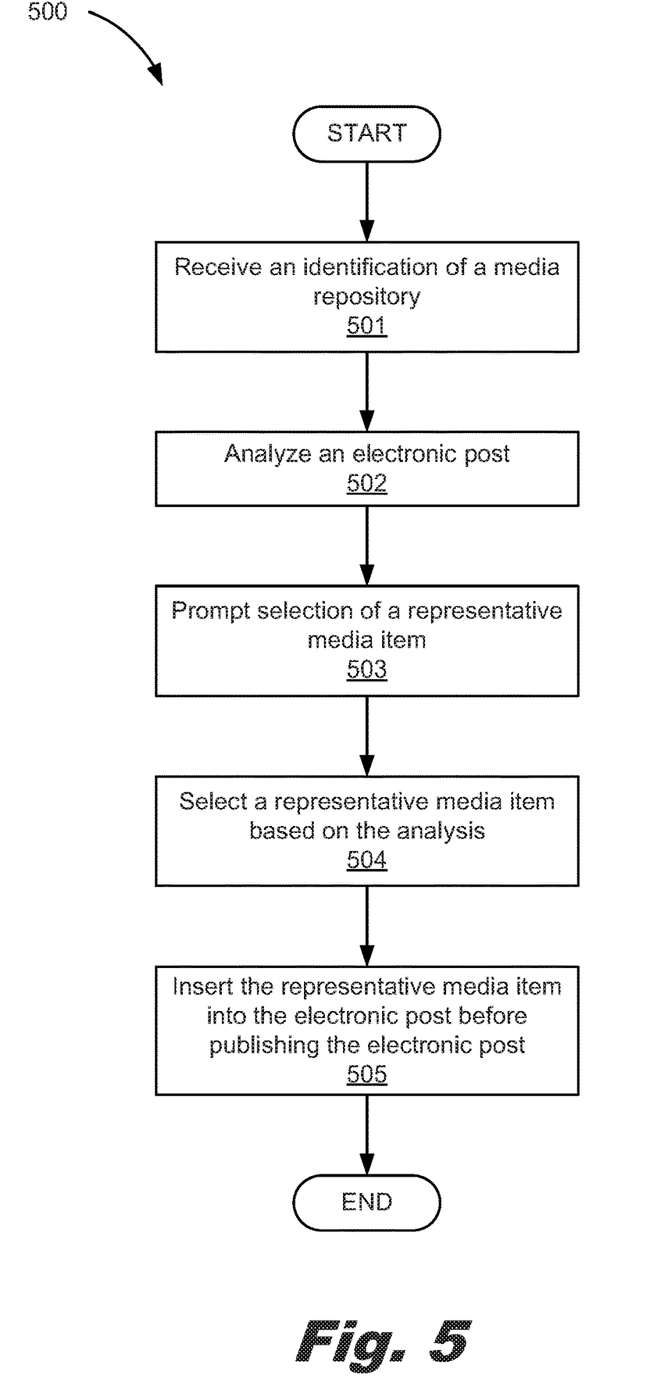
FIG. 5 depicts a flowchart of a method for selecting a representative media item for an electronic post, according to another example of principles described herein.

FIG. 5 depicts a flowchart of a method (500) for selecting a representative media item for an electronic post (FIG. 3, 310), according to another example of principles described herein. According to the method (500), identification of a media repository (FIG. 3, 312) is received (block 501). That is, as described above a media repository (FIG. 3, 312) is a source from which the representative media item is selected. As described above, the media repository (FIG. 3, 312) may refer to any database where media is stored and the indication of such a media repository (FIG. 3, 312) may come from a user or a manager of the platform or forum where an electronic post is to be published. Next, the electronic post is analyzed (block 502). This may be performed as described above in connection with FIG. 2.

The media selector (FIG. 1, 106) may then present a number of candidate media items and may prompt (block 503) the user to select a particular media item as the representative media item. Along with such a prompt (block 503), a notification may be presented to the user as to why they would want to include such a media item, i.e., to increase the impact of their post. Explanation may also be provided as to why each particular media item is presented as a candidate. Based on a response to the prompt, the system (FIG. 1, 100) may select (block 504) a representative media item for the electronic post and insert (block 505) the representative media item into the electronic post (FIG. 3, 310). In some examples, these operations may be performed as described above in connection with FIG. 2.

Figure 6:
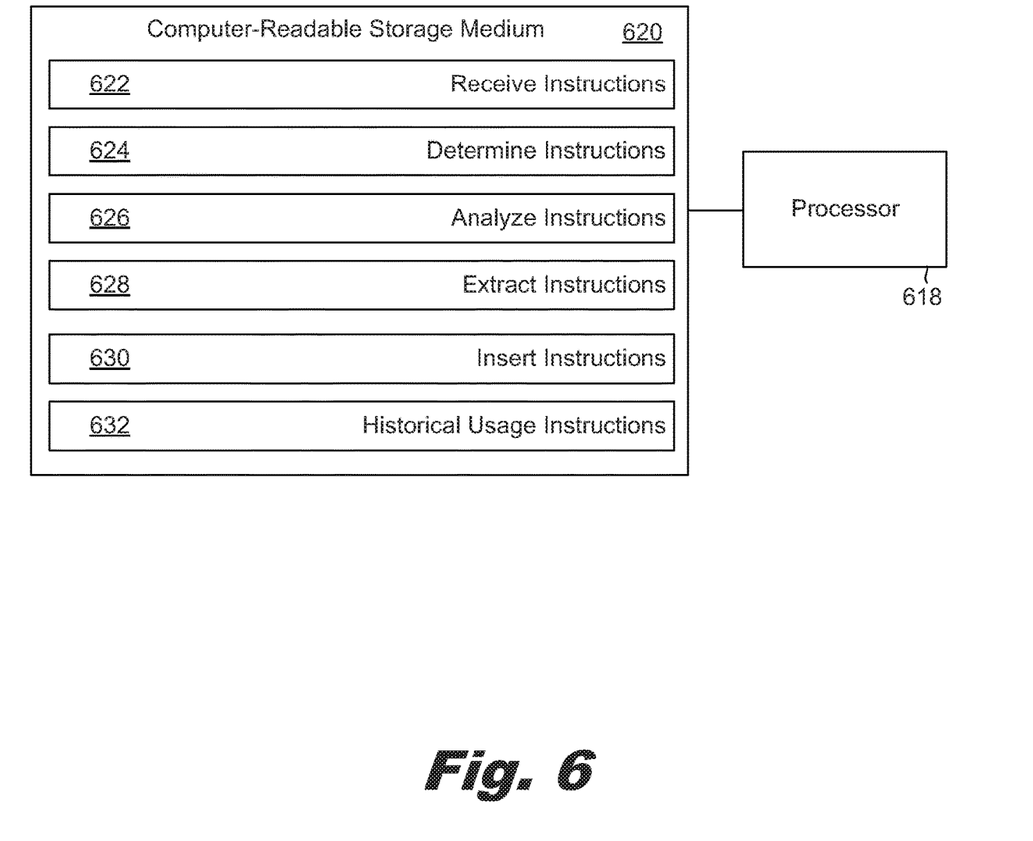
FIG. 6 depicts a computer readable storage medium for selecting a representative media item for an electronic post, according to an example of principles described herein.

FIG. 6 depicts a computer readable storage medium (620) for selecting a representative media item for an electronic post (FIG. 3, 310), according to an example of principles described herein. To achieve its desired functionality, a computing system includes various hardware components. Specifically, a computing system includes a processor (618) and a computer-readable storage medium (620). The computer-readable storage medium (620) is communicatively coupled to the processor (618). The computer-readable storage medium (620) includes a number of instructions (622, 624, 626, 628, 630, 632) for performing a designated function. The computer-readable storage medium (620) causes the processor (618) to execute the designated function of the instructions (622, 624, 626, 628, 630, 632).

Referring to FIG. 6, receive instructions (622), when executed by the processor (618), cause the processor (618) to receive an identification of a media repository (FIG. 3, 312) from which a representative media item is extracted. Determine instructions (624), when executed by the processor (618), may cause the processor (618) to determine that an electronic post (FIG. 3, 310), such as a social media post is not associated with an associated media item prior to insertion of the representative media item. Analyze instructions (626), when executed by the processor (618), may cause the processor (618) to, analyze the social media electronic post (FIG. 3, 310). Extract instructions (628), when executed by the processor (618), may cause the processor (618) to extract a media item from the media repository (FIG. 3, 312) as the representative media item based on the analysis. Insert instructions (630), when executed by the processor (618), may cause the processor (618) to insert the representative media item for the social media electronic post (FIG. 3, 312) before publishing the electronic post (FIG. 3, 312) to the social media site. Historical usage instructions (632), when executed by the processor (618), may cause the processor (618) to analyze historical usage of particular representative media items by an author. In this example, the media extracted as the representative media item is based on the historical usage.

Aspects of the present system and method are described herein with reference to flowchart illustrations and/or block diagrams of methods, apparatus (systems) and computer program products according to examples of the principles described herein. Each block of the flowchart illustrations and block diagrams, and combinations of blocks in the flowchart illustrations and block diagrams, may be implemented by computer usable program code. The computer usable program code may be provided to a processor of a general purpose computer, special purpose computer, or other programmable data processing apparatus to produce a machine, such that the computer usable program code, when executed via, for example, the processor of the computing system or other programmable data processing apparatus, implement the functions or acts specified in the flowchart and/or block diagram block or blocks. In one example, the computer usable program code may be embodied within a computer readable storage medium; the computer readable storage medium being part of the computer program product. In one example, the computer readable storage medium is a non-transitory computer readable medium.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
    determining that an electronic post generated by an author is not associated with an associated media item by:
        searching for a tag that identifies an embedded media item in the electronic post; and
        searching for a uniform resource locator in the electronic post which uniform resource locator directs a computing system to a website that includes media items;
    textually analyzing the electronic post; and
    responsive to a user input to transmit the electronic post:
        selecting a representative media item for the electronic post based on the textual analysis; and
        inserting the representative media item into the electronic post before publishing the electronic post.

2. The computer-implemented method of claim 1, wherein the electronic post is not associated with an associated media item prior to selection of the representative media item.

3. The computer-implemented method of claim 2, wherein the associated media item is selected from the group consisting of an embedded media item and a linked media item.

4. The computer-implemented method of claim 1, wherein:
    textually analyzing the electronic post comprises determining a topic for the electronic post; and
    the representative media item corresponds to the topic.

5. The computer-implemented method of claim 1, further comprising receiving an identification of a media repository from which the representative media item is selected.

6. The computer-implemented method of claim 5, wherein the media repository is selected from the group consisting of:
    an album of the author of the electronic post;
    a media repository service;
    a website;
    an internet search engine; and
    an album of a contact of the author.

7. The computer-implemented method of claim 5, wherein the indication is received from an entity selected from the group consisting of the author of the electronic post and a manager of the platform through which the electronic post is to be published.

8. The computer-implemented method of claim 1, wherein:
    textually analyzing the electronic post comprises identifying individuals associated with the electronic post; and
    the representative media item is selected based on identified individuals.

9. The computer-implemented method of claim 8, wherein the representative media item is selected based on characteristics of the identified individuals.

10. The computer-implemented method of claim 8, wherein individuals are identified via at least one of:
    tags within the electronic post;
    identifiers within the electronic post; and
    fields associated with the electronic post.

11. The computer-implemented method of claim 1, further comprising prompting selection of the representative media item from a set of candidate media items.

12. The method of claim 1, wherein selecting a representative media item for the electronic post further comprises selecting the representative media item from a library of previously posted media to a social media website.

13. A system comprising:
    a media determiner to determine that an electronic post generated by an author is not associated with an associated media item by:
        searching for a tag that identifies an embedded media item in the electronic post; and
        searching for a uniform resource locator in the electronic post, which uniform resource locator directs a computing system to a website that includes media items;
    a textual analyzer to, responsive to a user input to transmit the electronic post, textually analyze the electronic post;
    a media selector to, responsive to the user input, select a representative media item for the electronic post based on the textual analysis; and
    a message editor to, responsive to the user input, insert the representative media item into the electronic post before publishing the electronic post.

14. The system of claim 13, further comprising a machine learner to determine patterns of representative media item selection by the author.

15. The system of claim 13, further comprising an indication generator to provide an indication to the author of the rationale for including the representative media item in the electronic post.

16. A computer program product, the computer program product comprising a non-transitory computer readable storage medium having program instructions embodied therewith, the program instructions executable by a processor to cause the processor to:

receive an identification of a media repository from which a representative media item is extracted; and responsive to a user input to transmit a social media electronic post:

determine that the social media electronic post generated by an author is not associated with an associated media item by:

searching for a tag that identifies an embedded media item in the social media electronic post; and searching for a uniform resource locator in the social media electronic post, which uniform resource locator directs a computing system to a website that includes media items;

textually analyze the social media electronic post;

extract, based on the textual analysis, a media item from the media repository as a representative media item for the electronic post; and insert the representative media item into the social media electronic post before publishing the social media electronic post.

17. The computer program product of claim 16, wherein textually analyzing the electronic post comprises at least one of:

keyword identification;
context analysis;
organization identification;
brand identification;
sentiment analysis;
tone analysis;
location identification; and
temporal identification.

18. The computer program product of claim 16:

further comprising program instructions executable by a processor to cause the processor to analyze historical selections of representative media items by the author; and wherein extracting, based on the textual analysis, a media item from the media repository as a representative media item for the electronic post is based on the historical selections.

19. The computer program product of claim 16, wherein extracting a media item from the media repository as the representative media item for the electronic post is further based on a social network provider.

* * * * *